United States Patent [19]

Ruyle

[11] Patent Number: 4,661,046

[45] Date of Patent: Apr. 28, 1987

[54] MANURE VACUUM WAGON POWER ASSIST AUGER

[76] Inventor: Phillip L. Ruyle, Box 141 A, Rte. #1, Medora, Ill. 62063

[21] Appl. No.: 780,675

[22] Filed: Sep. 26, 1985

[51] Int. Cl.⁴ .......................... F04B 23/14; F10B 3/00
[52] U.S. Cl. .................................... 417/203; 417/244; 417/430; 417/900; 417/205; 415/72; 406/57; 406/116; 406/135
[58] Field of Search ............... 415/71, 72, 73, DIG. 3; 406/55–58, 113–116, 135; 417/900, 203, 205, 430, 244

[56] References Cited

U.S. PATENT DOCUMENTS

| 603,077 | 4/1898 | Day | 406/56 X |
| 3,221,661 | 12/1965 | Swearington | 415/72 |
| 4,019,830 | 4/1977 | Reid | 415/72 |
| 4,531,892 | 7/1985 | Nasman et al. | 417/900 X |
| 4,557,672 | 12/1985 | Levine | 415/DIG. 3 X |
| 4,594,006 | 6/1986 | Depeault | 417/900 X |

FOREIGN PATENT DOCUMENTS 1105693  7/1984  U.S.S.R. ............................... 415/75

Primary Examiner—Carlton R. Croyle
Assistant Examiner—Theodore Olds
Attorney, Agent, or Firm—Harvey B. Jacobson

[57] ABSTRACT

Apparatus for removing manure from a manure pit or lagoon comprises an elongate screw-type auger having an inlet end which is inserted into the manure, and a suction hose from a vacuum wagon connected to the auger outlet. The combined action of the mechanical auger screw with the applied suction is effective in removing manure of widely varying liquid content from the pit or lagoon.

12 Claims, 12 Drawing Figures

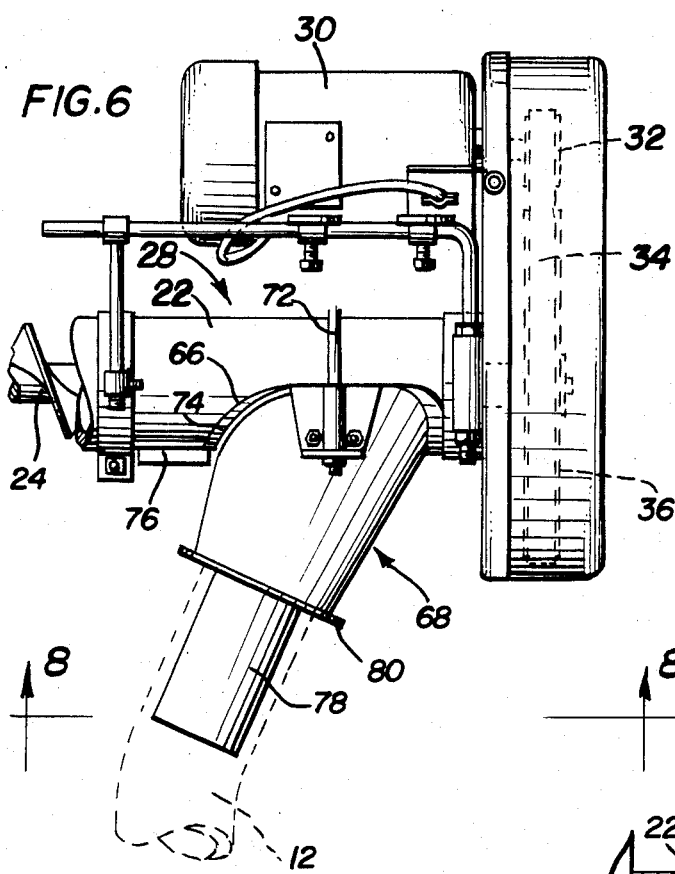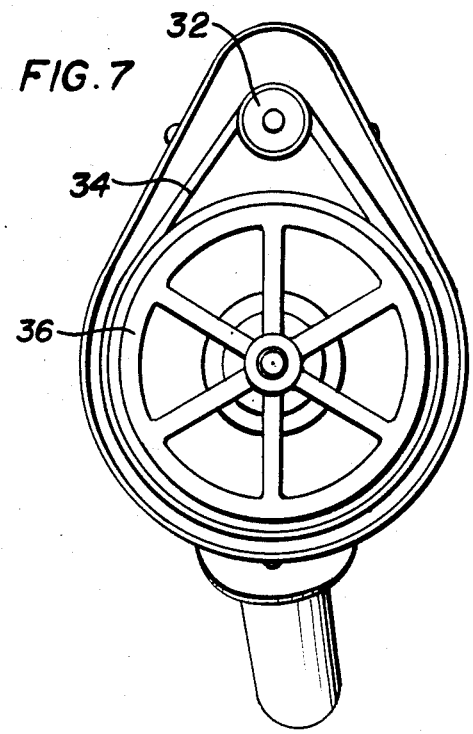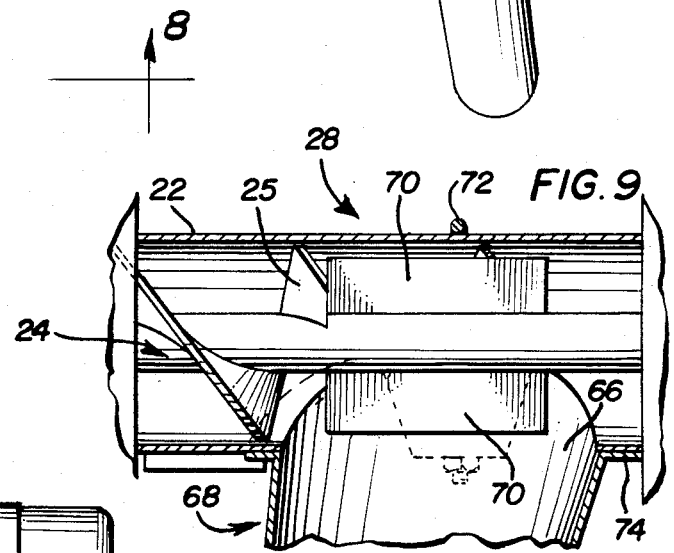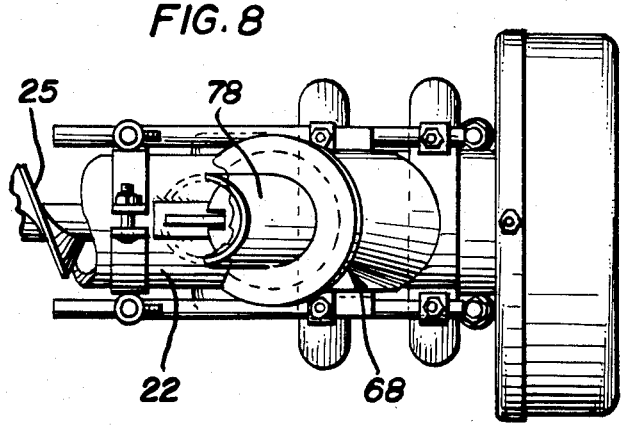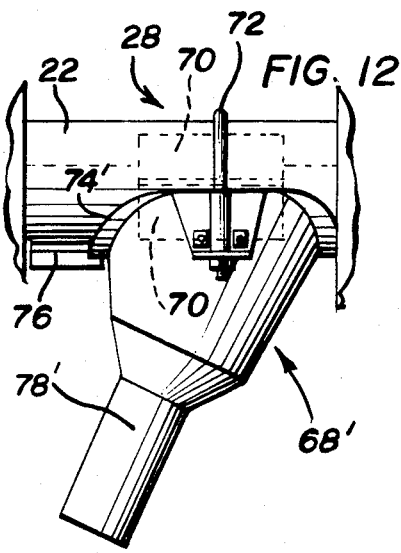

MANURE VACUUM WAGON POWER ASSIST AUGER

BACKGROUND OF THE INVENTION

This invention relates to a method and apparatus primarily intended for use in pumping out manure pits, lagoons and the like on farms or ranches.

It is common practice in farming to store animal manure in pits or outdoor lagoons for subsequent use as fertilizer. Generally, manure is removed from a pit or lagoon by suction, using a suction wagon with a suction hose which is placed in the manure. When filled, the wagon is moved to a fertilizing site and the manure is discharged. In manure pits and lagoons of this type, the heavier manure material tends to settle to the bottom and eventually cake or generally solidify to an extent that it cannot be removed by suction. Thus, over a period of time, an ever-increasing depth of solid manure forms and collects at the bottom of the pit or lagoon, and cannot be effectively removed by a suction wagon.

Chemical treatments have been proposed in connection with manure in pits or lagoons, but have not proved entirely successful in overcoming the solidification buildup as described above. The present invention provides an alternative solution.

SUMMARY OF THE INVENTION

In accordance with the invention, there is provided a method and apparatus for use in pumping manure from a pit or lagoon, wherein a suction hose, conveniently associated with a conventional suction wagon, is connected to an upper outlet end of an elongate auger casing which has an internal mechanical screw-type auger, the lower inlet end of which is placed at the bottom of the pit or lagoon.

For optimum pumping, the auger casing should be substantially airtight, with the suction hose being connected to the upper outlet end of the casing through a suitable hose adapter. It is found that the combined mechanical-pneumatic action of the apparatus is remarkably effective in pumping out manure both in more liquid and more solid states. Thus, it is considered that the more liquid state manure is pumped out more predominantly by suction, while the more solid state manure is removed more predominantly by the mechanical action of the screw auger. In use, more effective removal of the solidifed manure from the bottom of pits and lagoons has been achieved by use of the invention than with previsously known techniques.

Additional features of the invention include, for example, the provision of an adjustable auger inlet section controlled by an operating rod extending toward the auger outlet, and an optional sled-type fitting for the inlet end of the auger casing for use in lagoons for preventing the auger from sinking into mud at the bottom of a lagoon.

These together with other objects and advantages which will become subsequently apparent reside in the details of construction and operation as more fully hereianafter described and claimed, reference being had to the accompanying drawings forming a part hereof, wherein like numerals refer to like parts throughout.

BRIEF DESCRIPTION OF DRAWINGS

FIG. 6 is an elevational view of a discharge end portion of the auger.

FIG. 7 is a sectional view on line 7—7 of FIG. 6.

FIG. 8 is a sectional view on line 8—8 of FIG. 6.

FIG. 9 is an enlarged sectional view of a part of the auger as shown in FIG. 6.

FIG. 12 is an elevational view of the outlet end of the auger showing a modified outlet fitting.

DESCRIPTION OF PREFERRED EMBODIMENT

Figure 1:
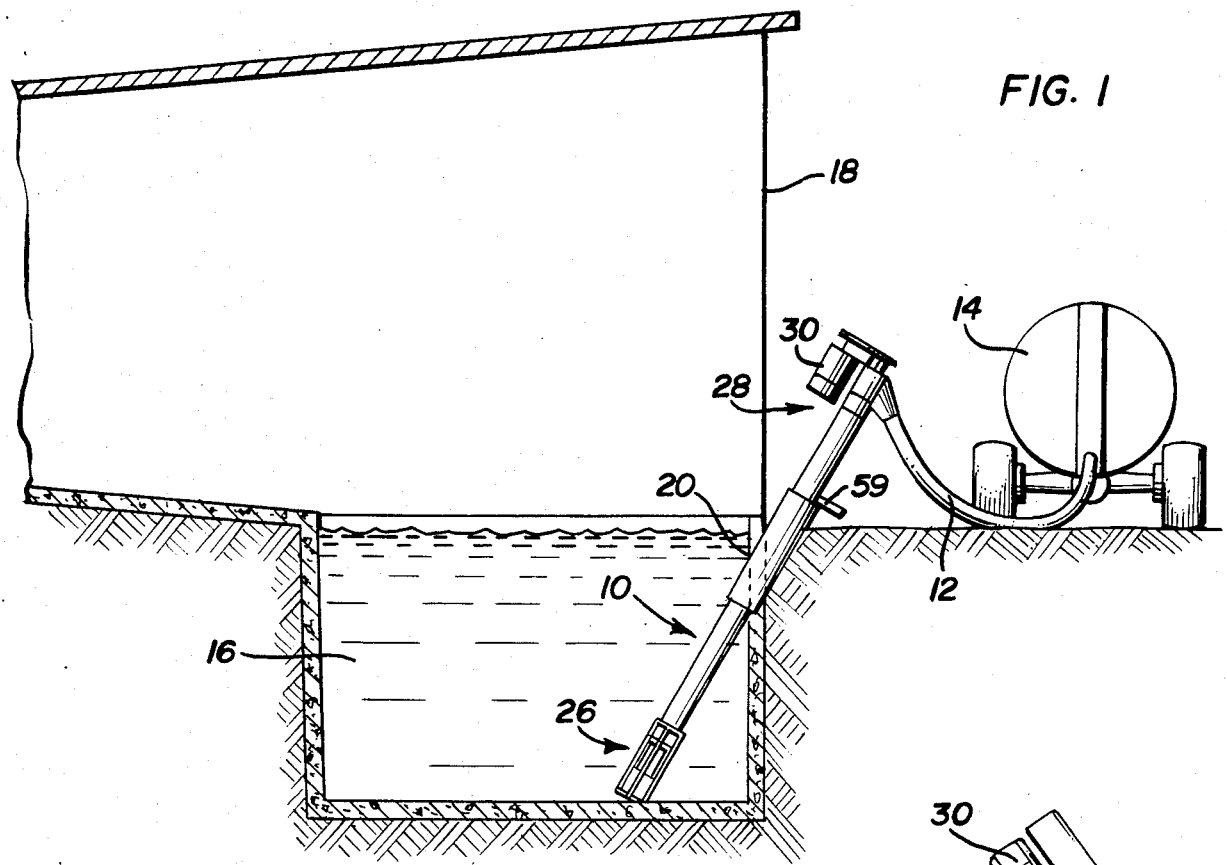
FIG. 1 is a sectional partly diagrammatic elevational view of apparatus in accordance with the invention including a vacuum assist auger as used for pumping out a manure pit.
Figure 2:
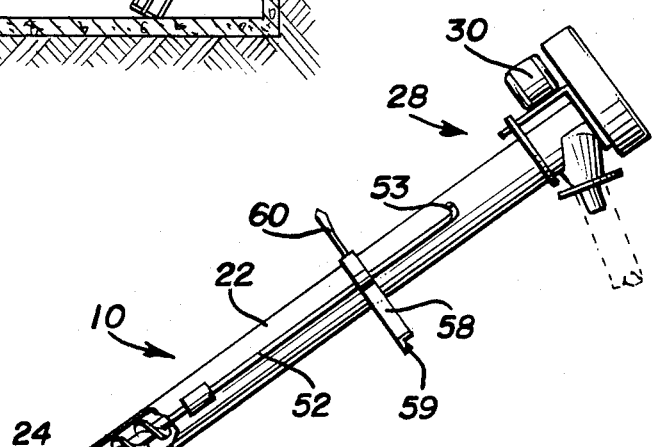
FIG. 2 is an enlarged elevational view, part broken away, of the auger.
Figure 10:
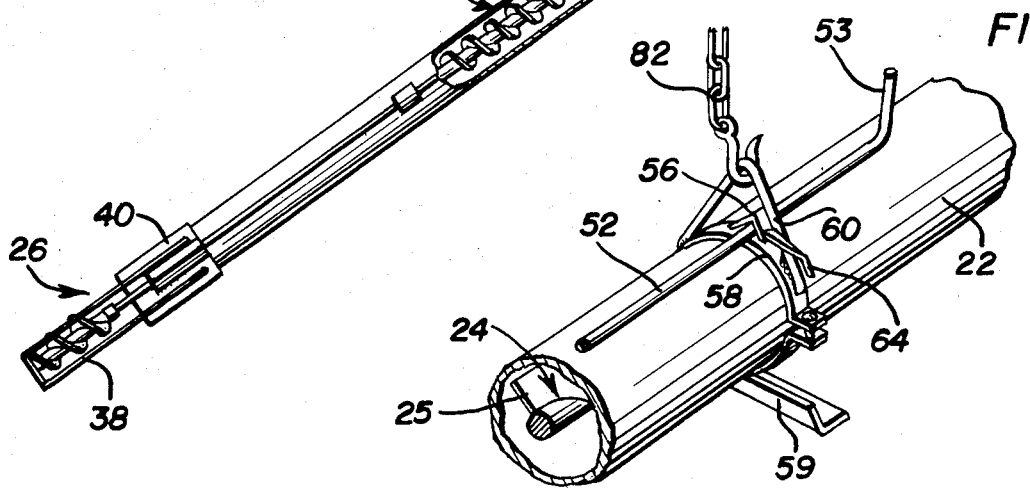
FIG. 10 is a perspective view of a portion of the auger showing a lifting hook.

FIG. 1 shows apparatus in accordance with the invention comprising a screw-type auger 10 connected via a suction hose 12 to a vacuum wagon 14 (not to scale), the auger being used to pump out manure from a pit 16 forming part of a hog building 18, the auger being inserted into the pit through a pump-out port 20. Details of the apparatus will be described with particular reference to FIGS. 2 to 12.

Auger 10 is a generally well-known grain-type auger having an elongate cylindrical casing 22 with an internal coaxial auger screw 24. The auger may, for example, be about 14' 6" in length with a diameter of about 6", but these dimensions may be varied. The auger has an inlet end generally indicated at 26 and an outlet end generally indicated at 28. Screw 24 is mounted in an inlet end bearing (to be described) and a conventional form of outlet end bearing (not shown). The screw may be rotated in known manner by a motor 30 mounted at the outlet end of the casing through a drive pulley 32, a belt 34, and a driven pulley 36 on the auger shaft.

Figure 3:
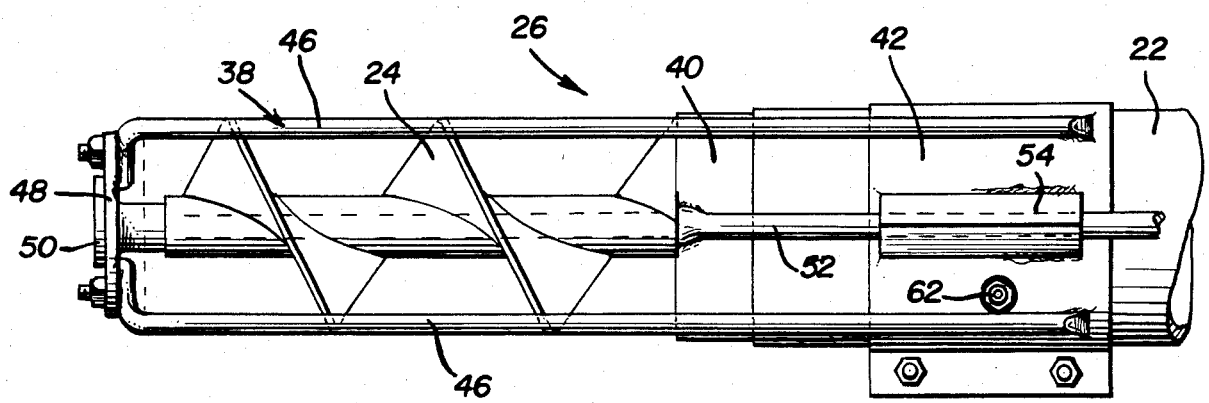
FIG. 3 is a further enlarged plan view of an inlet end portion of the auger.
Figure 4:
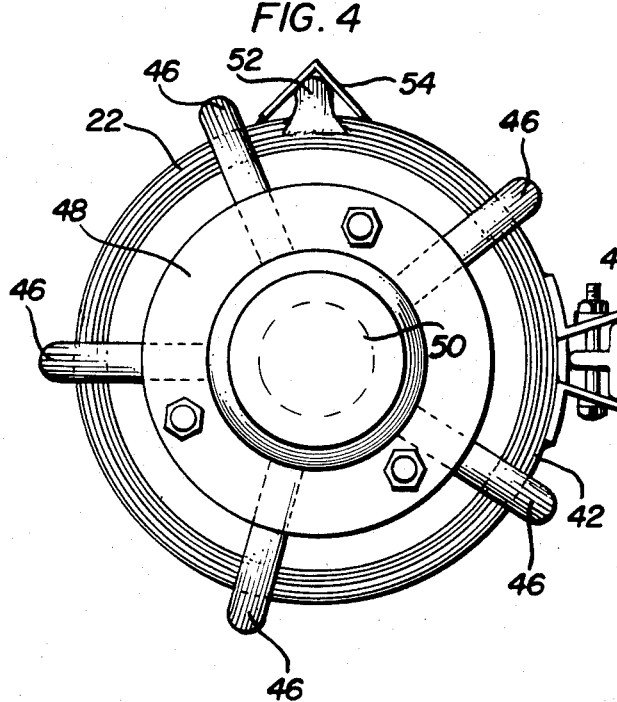
FIG. 4 is a still further enlarged end elevational view of the auger.
Figure 5:
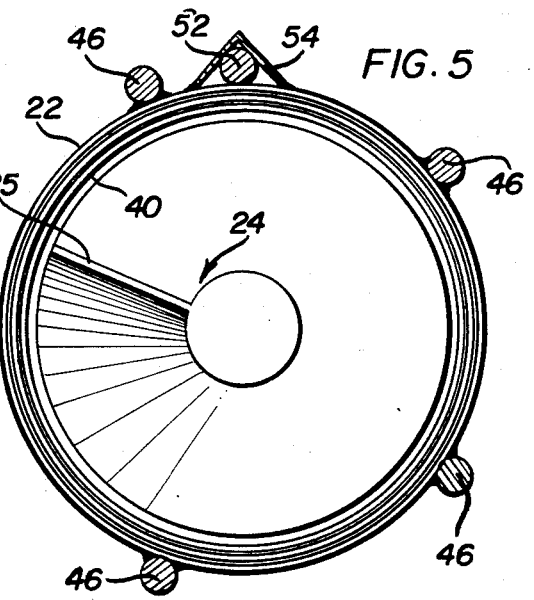
FIG. 5 is an enlarged sectional view on line 5—5 of FIG. 3.

Inlet end 26 of the auger defines an adjustable auger inlet gate formed by a guard 38 and an axially adjustable gate sleeve 40. Guard 38 incorporates a clamp ring 42 on the end of auger casing 22 (a T-piece 44 prevents the clamp ring from distorting the casing inwardly) and longitudinally extending circumferentially spaced rods 46 extending from the clamp plate, and welded at their distal ends to an end plate 48 including a bearing 50 for the distal or inlet end of the auger screw. It will be seen that the screw projects beyond the distal end of the auger casing 22, the amount of projection being, for example, about 12". Sleeve 40 fits in the end of casing 22 and can be moved axially between positions fully covering the exposed portion of the auger screw (a fully closed position of the auger inlet) and fully uncovering the exposed portion of the screw, as seen in FIG. 3 for example (the fully open position of the auger inlet). In order to move the sleeve, it has a welded-on rod 52 extending longitudinally along the outside of casing 22, through a guide 54 on clamp ring 42, through a further guide 56 on a further clamp ring 58, which has a welded-on lifting bracket 60. Rod 52 terminates in a handle 53 adjacent the outlet end of the auger for moving the rod longitudinally thereby adjusting the degree of opening of the auger inlet by moving sleeve 40 accordingly.

Clamp ring 42 may be provided with one or more grease nipples 62 for lubricating the space between casing 22 and sleeve 40 so as to facilitate movement of the sleeve and also provide a seal between the sleeve and the casing. Rod 52 may be provided with a latch device 64 associated with clamp ring 58 for releasably fixing the rod and sleeve 40 in adjusted position thereby setting the degree of opening of the auger inlet.

Clamp ring 58 may be adjusted lengthwise of the auger casing and may carry an adjustable stop 59 for example, for engaging a port such as port 20 of a manure pit to set the depth of the auger inlet in the pit.

At its outlet end 28, casing 22 has an outlet opening 66 associated with a funnel-shaped outlet fitting 68. It will be noted that the screw flights 25 on auger screw 24 terminate just short of outlet opening 66, and the screw has a circumferential series of radial paddles 70 aligned with the opening for urging material through the outlet.

Fitting 68 may be clamped to casing 22 by a U-bolt 72 or the like, and may have a flange 74 around opening 66 with suitable gasketing or sealant (not shown) between the flange and casing 22. A projecting lug 76 on the casing may engage a slot (not shown) in flange 74 to locate fitting 68 longitudinally and circumferentially in alignment with opening 66. Fitting 68 has a reduced diameter outlet section 78 adapted to the diameter of the vacuum wagon hose 12 which may be clamped thereto by conventional means. Since the diameters of such hoses may vary, alternative fittings 68 may be provided for the auger with different diameter outlet sections. Outlet fitting 68 as shown in FIG. 6 has a flange 80 between the funnel-shaped portion and the outlet section, while the modified form of outlet fitting 68' shown in FIG. 12 is absent such flange.

In use, the auger may be manipulated into the manure pit by lifting same with a block and tackle 82 or the like (FIG. 10) and inserting same through the pump-out port 20. In operation, the combined mechanical action of the auger screw and the suction effect of the vacuum wagon are remarkably effective in providing manure removal over a wide range of manure consistencies ranging from manure in a substantially liquid state to manure in a substantially solid state. During manure removal, optimum operation of the apparatus may be obtained by adjustment of sleeve 40 to adjust the degree of opening of the auger inlet to suit the consistency of the manure. Thus, when handling thick manure the sleeve can be moved up and when the manure level drops down to the region of the inlet, the sleeve can be lowered to even further decrease the manure level. The suction force used may be that applied by conventional vacuum wagons, e.g. in the range of about 15 to 25 pounds.

Figure 11:
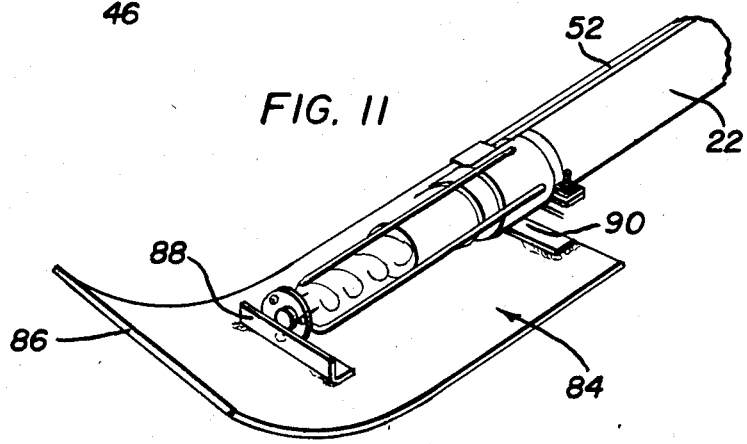
FIG. 11 is a perspective view of the inlet end portion of the auger showing an attachment fitting.

FIG. 11 shows an attachment fitting 84 in the form of a sled for the inlet end of the auger, for use in manure lagoons, for preventing the auger from sinking into the mud on the bottom of the lagoon. The sled may be formed of metal plate with an upwardly inclined forward end 86 to facilitate planing along the bottom of a lagoon, and suitable releasable attachments 88, 90 for securing the sled to the auger.

The foregoing is considered as illustrative of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a manure-containing pit, lagoon, or like container, apparatus for removing manure therefrom comprising an elongate auger for insertion into the container, said auger including an elongated hollow auger casing defining an open inlet end, an auger screw extending lengthwise in the casing and journalled therefrom, said screw protruding endwise outwardly of said inlet end and extending therefrom to a lateral outlet adjacent said outlet end of the casing, drive means for the screw, and suction-applying means for applying suction to the auger lateral outlet and including a hose connection extending between said lateral outlet and the suction-applying means.

2. The invention of claim 1 wherein the suction applying means comprises a vacuum wagon.

3. The invention of claim 1 including sleeve means adjustably telescopically engaged with said inlet end and extendable and retractable relative thereto and the protruding portion of said screw for adjusting the degree said protruding portion is covered by said sleeve means to suit manure of varying consistencies.

4. In combination with a manure-containing pit, lagoon, or the like container, apparatus for removing manure therefrom comprising an elongate auger for insertion into the container, the auger having an auger casing, an auger screw extending lengthwise in the casing from an inlet at one end of the case to an outlet adjacent the other end of the casing, drive means for the screw, suction-applying means for applying suction to the auger outlet through a hose connection extending between the outlet and the suction-applying means, means for adjusting the degree of opening of the auger inlet to suit manure of varying consistencies, said auger screw protruding from the casing at said one end to define the inlet, said adjusting means including a longitudinally adjustable sleeve associated with the casing for selectively covering and uncovering the protruding portion of the screw, and actuating means for the sleeve.

5. The invention of claim 4 wherein the actuating means comprises an actuating rod extending from the sleeve lengthwise along the casing toward said other end.

6. The invention of claim 1 wherein the auger screw comprises a shaft with a screw flight which terminates short of the outlet, and radially extending paddle means on the shaft axially aligned with the outlet for forcing manure through the outlet.

7. The invention of claim 1 including a sled attachment for said one end of the auger casing for preventing the auger sinking into mud at the bottom of a manure lagoon.

8. Apparatus for use in removing manure from a manure-containing pit or lagoon comprising an elongate auger having an auger casing, an auger screw mounted lengthwise in the casing for transporting manure from an inlet at one end of the casing to an outlet adjacent the other end of the casing, drive means for rotating the screw, an attachment for the outlet for connecting the outlet to a hose leading from a source of suction, adjustment means for adjusting the degree of opening of the inlet, said auger screw protruding from the casing at said one end to define the inlet, said adjustment means including a longitudinally adjustable sleeve associated with said one end of the casing and actuating means extending along the casing for longitudinally adjusting the sleeve between positions substantially fully exposing the protruding portion of the screw, and substantially fully covering the protruding portion of the screw.

9. The invention of claim 8 including grease-applying means for introducing grease between the casing and the sleeve to assist in movement of the sleeve and provide a seal.

10. The invention of claim 8 including circumferentially spaced rods extending from said one end of the casing to a plate provided with a bearing for the protruding end of the auger screw, the sleeve being received internally of the rods.

11. The invention of claim 8 including a sled attachment for said one end of the auger casing for preventing the auger sinking into mud at the bottom of a manure lagoon.

12. The invention of claim 11 wherein the attachment includes a metal plate having a substantially flat body portion and an upwardly bent forward portion, and securement means for releasably attaching the plate to said one end of the auger.

* * * * *